United States Patent
Tylik et al.

(10) Patent No.: US 9,983,807 B1
(45) Date of Patent: May 29, 2018

(54) STATIC SERVICE LEVELS AND APPLICATION SPECIFIC USAGE TAGS FOR STORAGE POLICY BASED MANAGEMENT OF STORAGE RESOURCES

(71) Applicant: EMC Corporation, Hopkinton, MA (US)

(72) Inventors: Dmitry Nikolayevich Tylik, Westborough, MA (US); Sergey Alexandrovich Alexeev, St. Petersburg (RU); Alexey Vladimirovich Shusharin, Saint Petersburg (RU); Alexander Nickolaevich Alexeev, Saint Petersburg (RU); Karl M. Owen, Chapel Hill, NC (US); Wadah Sayyed, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 14/673,027

(22) Filed: Mar. 30, 2015

(51) Int. Cl.
*G06F 12/02* (2006.01)
*G06F 3/06* (2006.01)
*G06F 9/455* (2018.01)

(52) U.S. Cl.
CPC .......... *G06F 3/0619* (2013.01); *G06F 3/0665* (2013.01); *G06F 3/0689* (2013.01); *G06F 9/45545* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2004/0120225 | A1* | 6/2004 | Dalal | G06F 3/0605 369/30.04 |
| 2008/0222311 | A1* | 9/2008 | Lee | G06F 3/061 710/6 |
| 2009/0193110 | A1* | 7/2009 | Gusler | G06F 3/0605 709/223 |

(Continued)

OTHER PUBLICATIONS

White Paper; "EMC VNX FAST VP"; VNX5100, VNX5300, VNX5500, VNX5700, & VNX7500; Dec. 2013; 25 pages.

(Continued)

*Primary Examiner* — Tracy Chan
(74) *Attorney, Agent, or Firm* — BainwoodHuang

(57) ABSTRACT

Storage system characteristics are processed to generate a service level for a storage system that is one of a fixed number of service levels. Application specific usage tags describing application types the storage system is appropriate to support may also be generated. The service level and application specific usage tags are stored into a storage system capability profile and made available, together with any metadata needed to describe the application specific usage tags, to a system associated with a virtualization environment. A request to provision storage resources for a virtual machine is subsequently received, including a policy profile having a requested service level and one or more application specific usage tags describing the storage requirements of the virtual machine. If the policy profile matches the capability profile, storage resources are provisioned for the virtual machine from the storage system.

19 Claims, 8 Drawing Sheets

(56) References Cited

U.S. PATENT DOCUMENTS

2009/0240911 A1* 9/2009 Yamada ............... G06F 3/0605
711/171
2013/0297903 A1* 11/2013 Kaneko ............... G06F 3/0605
711/165

OTHER PUBLICATIONS

White Paper; "Implementing VMWARE VSPHERE Storage API for Storage Awareness With Symmetrix Storage Arrays"; Sep. 2014; 43 pages.

* cited by examiner

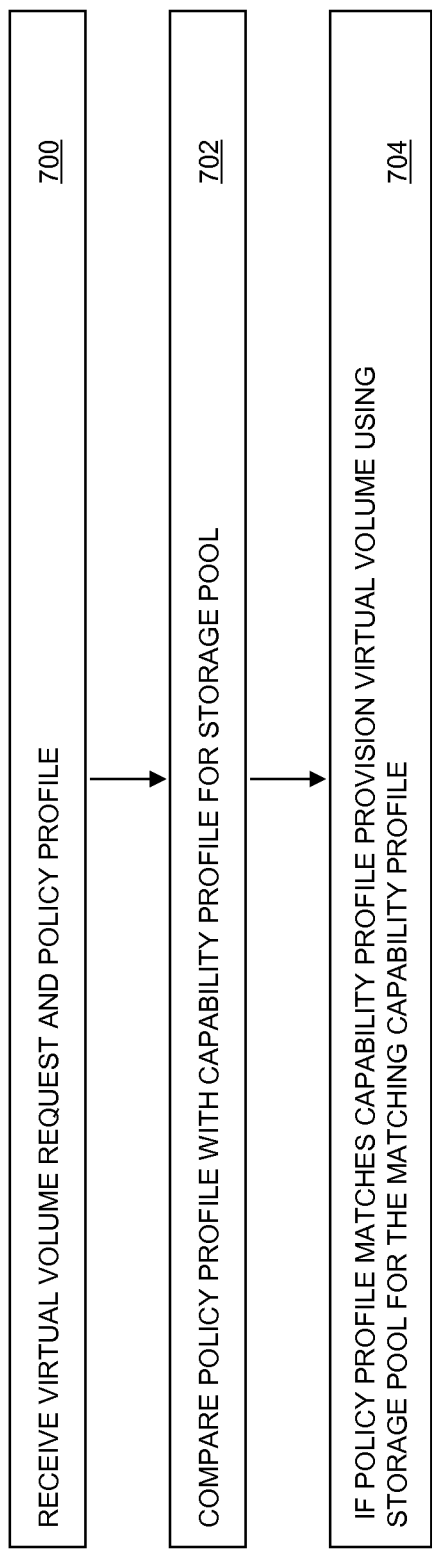

STATIC SERVICE LEVELS AND APPLICATION SPECIFIC USAGE TAGS FOR STORAGE POLICY BASED MANAGEMENT OF STORAGE RESOURCES

BACKGROUND

As it is generally known, virtual machines are computer software emulations of hardware computer systems. Virtual machines are typically created by and run on a hypervisor or virtual machine monitor that may also be referred to as a virtualization platform or virtualization environment.

As with the hardware computer systems that they emulate, virtual machines must provide data storage for the programs that they execute. It is accordingly necessary to provision data storage resources to a virtual machine from a physical storage system, for example by assigning disk space of a remote storage server system to the virtual machine.

SUMMARY

Previous approaches to provisioning data storage resources to virtual machines have exhibited significant shortcomings. In previous systems, virtual volumes have been used to represent individual disks of virtual machines, and have been provisioned from physical storage resources in physical storage systems. However, the processes for provisioning specific physical storage resources to virtual volumes for specific virtual machines have been problematic, and difficult to optimize, due to the specific storage system characteristics made available by storage systems during the storage resource provisioning process. For example, previous systems have exposed lower level storage system parameters during the storage provisioning process, but these lower level parameters have been difficult to match to requirements of specific virtual machines. In particular, administrators for virtualization environments that support the virtual machines often have a perspective on the needs of individual virtual machines that is based on higher level requirements of those virtual machines, and/or of the applications running on those virtual machines, than is expressed by the lower level parameters that have been exposed by previous systems.

To address the above described and other shortcomings of previous solutions, a new system is disclosed for storage policy based management of storage resources based on static service levels and application specific usage tags. In the disclosed system, a storage management system uses storage system characteristics to generate a service level for each storage system. The service level generated for a storage system is one of a fixed number of service levels. Each one of the service levels represents a different estimated overall level of service available from a storage system, such as an average latency for input/output operations, or average input/output operations per second (IOPS). The storage management system stores the service level for each storage system into a capability profile associated with the storage system. The storage management system may then transmit the capability profile to a virtualization environment administration system. The virtualization environment administration system is used by a virtualization environment administrator to create storage policy profiles ("policy profiles") that describe the storage requirements of virtual machines that execute in a virtualization environment administered by the virtualization environment administrator.

The storage management system may subsequently receive a storage resource provisioning request, including a storage policy profile, from the virtualization administration system. The storage policy profile in the storage resource provisioning request represents the storage requirements of a virtual machine for which storage resources are requested to be provisioned. The storage policy profile includes a service level indicating a requested level of service for the virtual machine associated with the request. The storage management system compares the storage policy profile in the request to one or more capability profiles for storage resources. In the event that the service level in the storage policy profile matches a service level in one of the capability profiles, the storage management system provides an indication of a match between the storage policy profile and the capability profile. In response to the match indication, the storage management system provisions a virtual storage object (e.g. a virtual volume) from the storage system associated with the capability profile for use by the virtual machine associated with the storage policy profile.

In another aspect of the disclosed system, the capability profile includes a number of application specific usage tags. Each of the usage tags describes an application type that the storage system is appropriate to support. In one embodiment, the disclosed system provides a user interface to a storage administrator user, through which the storage administrator user enters one or more text usage tags to be associated with one of the storage systems. The usage tags indicated by the storage administrator user for a storage system are stored in the capability profile for that storage system. In one embodiment, new capability metadata is generated each time the storage administrator enters a new usage tag, indicating the new usage tag as a possible constraint for the usage tags capability. The new capability metadata may be transmitted to the virtualization environment administration system for use when generating storage policy profiles for virtual machines.

The disclosed system may be embodied to provide significant advantages over previous technologies. For example, the static service levels that may be generated for and included in the storage system capability profiles express the overall performance capability of a storage system in a way that enables the use of corresponding service levels in the storage policy profiles expressing the storage requirements for specific virtual machines. In this way the disclosed system provides virtualization administration systems and their users a convenient and powerful mechanism for specifying the needs of individual virtual machines during the storage provisioning process in terms of overall storage system capability. In addition, the application specific usage tags further allow storage system management systems and administrators to expose performance capabilities of storage systems in a succinct and meaningful way that further allows virtualization administration systems and administrators to request storage resource provisioning in a way that maps storage system performance capabilities to the applications running on the virtual machines in the virtualization environment. The advantages of embodiments of the disclosed system over previous systems may accordingly include improved provisioning of storage resources for virtual machines, which in turn may result in higher levels of overall system performance. The advantages of embodiments of the disclosed system over previous systems may further include improved usability for systems supporting the storage provisioning process.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 8 is a flow chart showing an example of steps performed in an illustrative embodiment of the disclosed system to determine whether a request for provisioning of storage resources will be granted.

DETAILED DESCRIPTION

Figure 1:
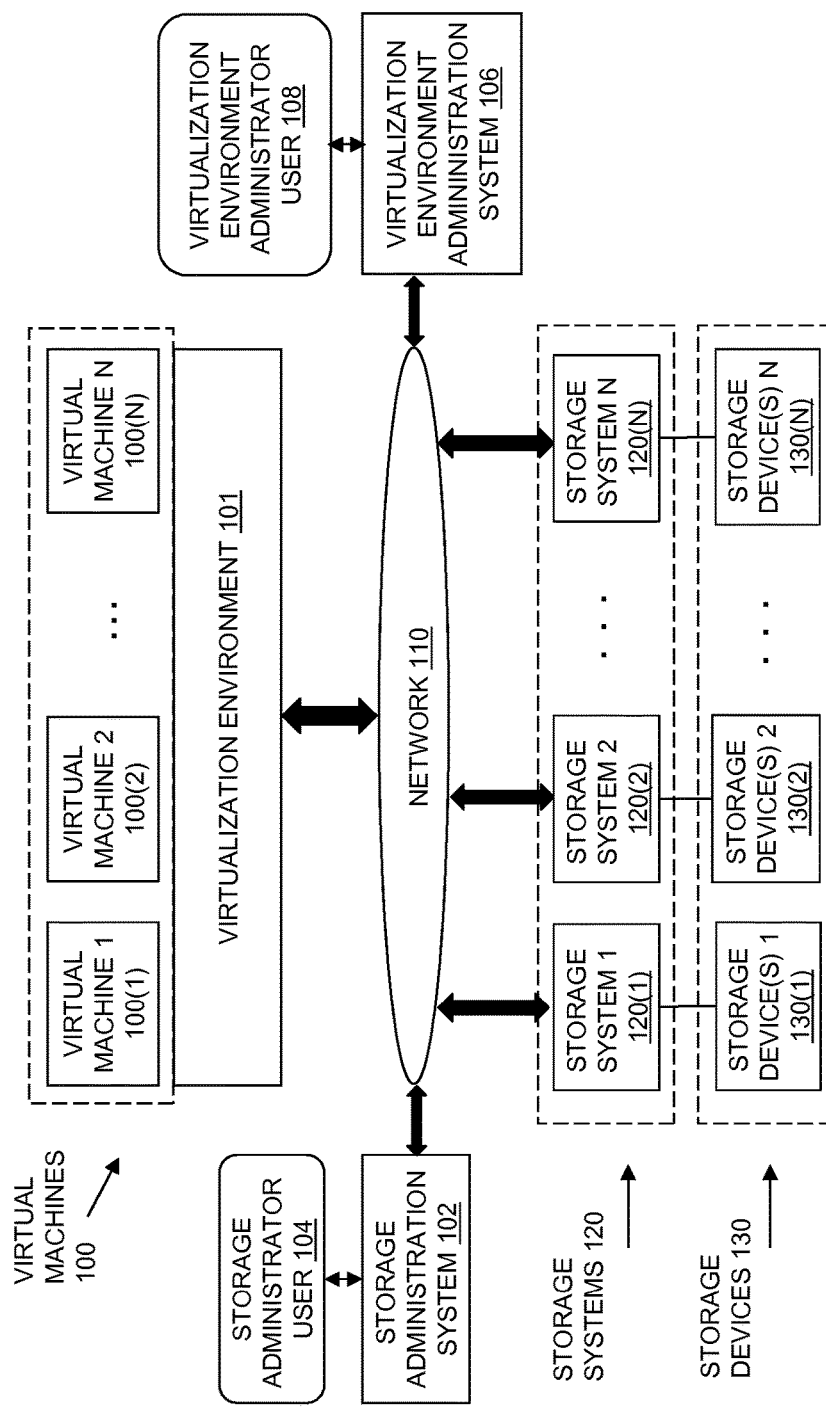
FIG. 1 is a block diagram showing an example of components in an operational environment including an embodiment of the disclosed system.

FIG. 1 is a block diagram showing an example of components in an operational environment including an embodiment of the disclosed system. As shown in FIG. 1, Virtual Machines 100, shown including Virtual Machine 1 100(1) through Virtual Machine N 100(N), execute on Virtualization Environment 101. Each of Virtual Machines 100 may be a computer software emulation of a hardware computer system, and may execute one or more programs as if they were executing on actual hardware. Each one of Virtual Machines 100 may, for example, include or consist of a complete simulation of a computer's underlying hardware, on which may execute various programs, such as a complete operating system, one or more application programs, and/or other specific types of programs. The Virtualization Environment 101 on which Virtual Machines 100 execute may, for example, include or consist of a hypervisor or virtual machine monitor, executing on one or more host computers.

During operation of the components shown in FIG. 1, Storage Server Systems 120 (i.e. Storage System 1 120(1) through Storage System N 120(N)) provide storage services to Virtual Machines 100, over one or more data communication networks, shown as Network 110. The storage services provided to Virtual Machines 100 from Storage Systems 120 are based on units of storage allocated from Storage Devices 130 (i.e. Storage Device 1 130(1) through Storage Device N 130(N)). Each one of Storage Systems 120 may include, be attached to or associated with one or more physical storage devices from which it may allocate units of physical storage. In the example of FIG. 1, Storage System 1 120(1) allocates units of storage from Storage Device(s) 1 130(1), Storage System 2 120(2) allocates units of storage from Storage Device(s) 2 130(2), etc. While Storage Device(s) 1 130(1) are shown directly connected to Storage System 1 120(1), and Storage Device(s) 2 130(2) are shown directly connected to Storage System 2 120(2), etc., the disclosed system is not so limited. In an alternative embodiment, some or all of Storage Devices 130 may be communicably connected to specific ones of Storage Systems 120 by way of one or more communication networks, e.g. including or consisting of a Storage Area Network (SAN) or the like.

Storage Systems 120 may each include at least one processor and program storage, such as memory and/or another computer readable medium, for storing program code executable on the processor, and for storing data operated on by such program code. Each of the Storage Systems 120 may further include one or more input/output devices and/or interfaces, such as data communication and/or peripheral devices and/or interfaces. The program code executing on each of the Storage Systems 120 may include software or firmware that provides one or more storage services to Virtual Machines 100.

Each of the Storage Devices 130 may be embodied using any specific kind of data storage mechanism, including but not limited to one or more non-volatile storage devices, such as magnetic disk drives, electronic flash drives, and/or optical drives.

The storage services provided by Storage Systems 120 to Virtual Machines 100 may be any specific type of storage service that provides units of external storage to a client from a storage server. For example, such storage services may be embodied as file-based storage services that provide external storage of files for a respective virtual machine, while allowing the externally stored files to be accessed as if they were located on the virtual machine's local storage. Such file-based storage services may be based on the Network File System (NFS) protocol, the Server Message Block (SMB) or Common Internet File System (CIFS) application-layer network protocol, the Apple Filing Protocol (AFP), or other appropriate protocols.

The storage services provided by Storage Systems 120 to Virtual Machines 100 may alternatively be embodied as block-based storage services that provide external storage in the form of blocks served by storage systems from disk storage devices. For example, such storage services may be embodied as block-based storage services employing the Internet Small Computer System Interface (iSCSI), and allowing the respective virtual machine to access external storage from the storage system as if it were from a locally attached disk. Such block-based storage services may also use Fibre Channel (FC) network technology, and/or the Serial Attached SCSI (SAS) protocol or the like in the context of Direct Attached Storage (DAS).

Also shown in FIG. 1 are a Storage Administration System 102 that is associated with and used by a Storage Administrator User 104. The Storage Administrator User 104 is responsible for managing Storage Systems 120 using the Storage Administration System 102. A Virtualization Environment Administration System 106 is also shown in FIG. 1, associated with and used by a Virtualization Environment Administrator User 108. The Virtualization Environment Administration User 108 is responsible for managing Virtualization Environment 101 and Virtual Machines 100 using the Virtualization Environment Administration System 106.

The Storage Administration System 102 and/or Virtualization Environment Administration System 106 may each consist of or include at least one processor, program storage, such as memory and/or another computer readable medium, for storing program code executable on the processor, and for storing data operated on by such program code. Each of Storage Administration System 102 and/or Virtualization Environment Administration System 106 may further include one or more input/output devices and/or interfaces, such as data communication and/or peripheral devices and/or interfaces, including a communication interface communicably coupled to Network 110, as well as a computer keyboard and computer mouse, and a display device operable to provide a user interface such as a graphical user interface and/or command line interface. The program code executing on Storage Administration System 102 and/or Virtualization Environment Administration System 106 may further include appropriate operating system and/or application software or tools. For example, Storage Administration System 102 may include program code that, when executed, supports the management of Storage Systems 120. Similarly, Virtualization Environment Administration System 106 may include program code that, when executed, supports management of Virtualization Environment 101 and Virtual Machines 100.

Figure 2:
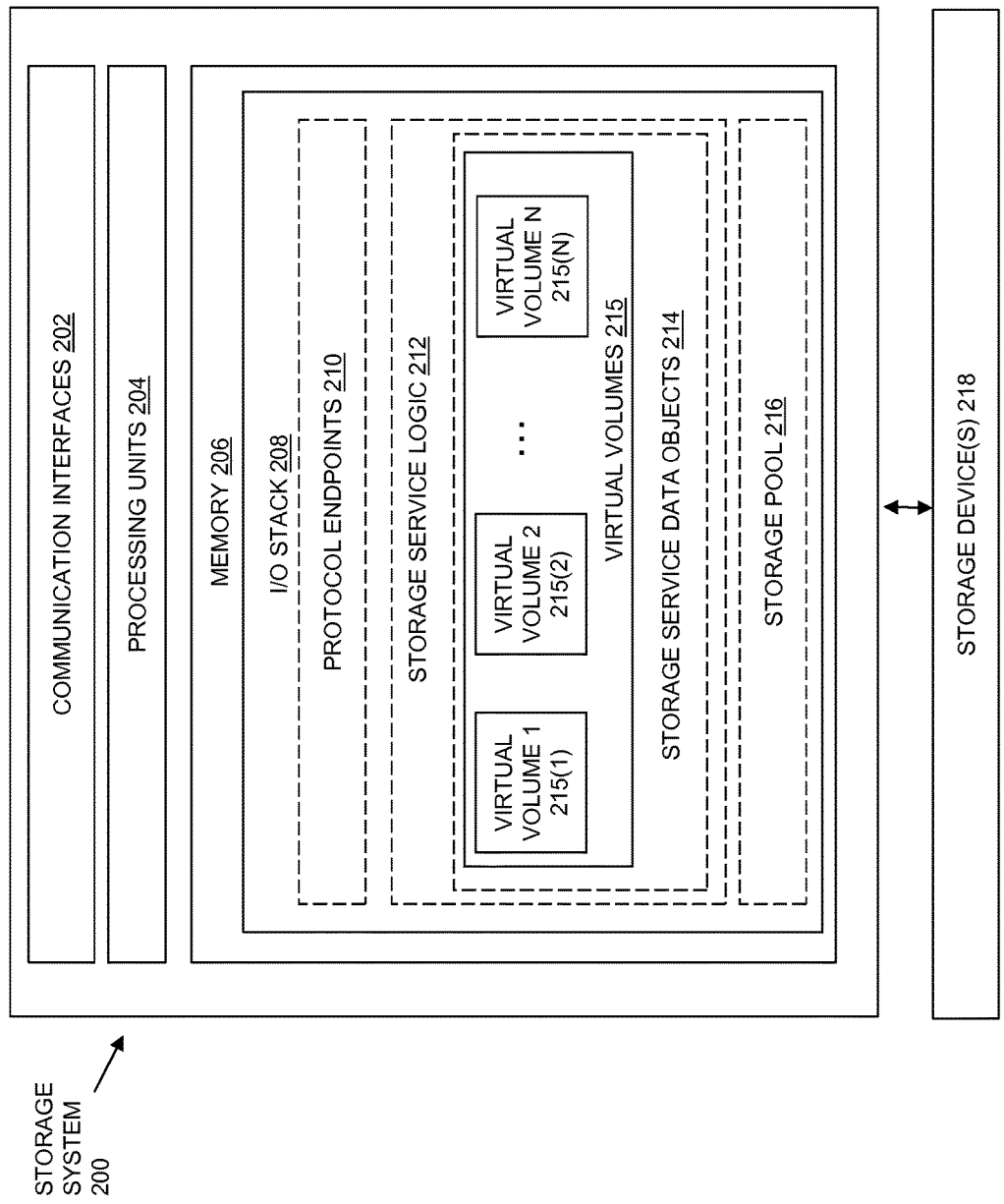
FIG. 2 is a block diagram showing an example of components in a storage system in an illustrative embodiment of the disclosed system.

FIG. 2 is a block diagram showing components in an illustrative embodiment of a storage system, i.e. Storage System 200. In the example of FIG. 2, Storage System 200 receives I/O requests from a virtual machine while providing a storage service to the virtual machine, according to block-based and/or file-based protocols, and responds to such I/O requests by reading data from or writing data to the Storage Device(s) 218. In the example of FIG. 2, the Storage System 200 includes one or more Communication Interfaces 202, a set of Processing Units 204, and Memory 206. The Communication Interfaces 202 include, for example, SCSI target adapters and network interface adapters for converting electronic and/or optical signals received over a network into electronic form for use by the Storage System 200. The set of Processing Units 204 includes one or more processing chips and/or assemblies. The Memory 206 includes both volatile memory (e.g., RAM), and non-volatile memory, such as one or more ROMs, disk drives, solid state drives, and the like. The set of Processing Units 204 and the Memory 206 together form control circuitry, which is constructed and arranged to carry out various methods and functions as described herein, e.g., alone or in coordination with similar control circuitry on one or more other data storage systems. The Memory 206 includes a variety of software constructs realized in the form of executable instructions. When the executable instructions are run by the set of Processing Units 204, the set of Processing Units 204 are caused to carry out the operations of the software constructs. Although certain software constructs are specifically shown and described, it is understood that the Memory 206 may include various other software constructs, which are not shown, such as an operating system, various applications, processes, and/or daemons.

In the example of FIG. 2, the Memory 206 includes an I/O Stack 208. The I/O Stack 208 provides an execution path for I/O requests received from individual virtual machines while providing one or more storage services to the Virtual Machines 100. The I/O Stack 208 is shown including Protocol End Points 210, Storage Service Logic 212, and Storage Pool 216. Those skilled in the art will also recognize that the I/O Stack 208 shown in FIG. 2 is simplified for purposes of concise explanation and illustration of the disclosed system, and that various components and/or elements other than those shown in FIG. 2 may also be present in the I/O Stack 208. While I/O requests received from virtual machines enter the I/O Stack 208 from the top and propagate downwards, the components of the I/O Stack 208 are described herein from the bottom to the top for ease of understanding.

The Storage Pool 216 organizes elements of the Storage Device(s) 218 into units of storage used by the Storage System 200 to provide one or more storage services. For example, in one embodiment, the Storage Pool 216 organizes elements of the Storage Device(s) 218 into "slices". A "slice" is an example of a unit of storage space (e.g. 256 megabytes or 1 gigabytes in size), which is derived from the Storage Device(s) 218. The Storage Pool 216 allocates slices of the Storage Device(s) 218 to be used by the Storage Service Logic 212 to form Storage Service Data Objects 214 that are provisioned to support storage services provided to Virtual Machines 100. The Storage Service Data Objects 214 may include a number of Virtual Volumes 215, shown as Virtual Volume 1 215(1) through Virtual Volume N 215(N). The Storage Pool 216 may allocate slices to objects in Storage Service Data Objects 214 that support file-based storage services, such as file-based virtual volumes (VVols). Alternatively, or in addition, the Storage Pool 216 may allocate slices for objects in Storage Service Data Objects 214 that support block-based storage services, such as block-based virtual volumes (VVols). In this way, Storage Service Data Objects 214 for both file-based and block-based storage services are built upon units of storage managed by the Storage Pool 216.

The Protocol End Points 210 expose the Storage Service Data Objects 214 to virtual machines for access by the virtual machines in accordance with respective storage service protocols. Thus, the Protocol End Points 210 may expose block-based objects (e.g. block-based VVols) through Fiber Channel or iSCSI protocols, and/or may expose file-based objects (e.g. file-based VVols) using NFS, CIFS, or SMB protocols.

While in the illustrative embodiment of FIG. 2, an example of one of the Storage Systems 120 in FIG. 1 is shown by Storage System 200, which includes a number of its own physical hardware components, e.g. hardware processing units, etc., those skilled in the art will recognize that the disclosed system is not limited in applicability to hardware embodiments of Storage Systems 120. For example, one or more of the Storage Systems 120 shown in FIG. 1 may alternatively be embodied wholly or in part as software program code executing in one or more of the Virtual Machines 100 that execute on the Virtualization Environment 101. In such an alternative embodiment, software based embodiments of Storage Systems 120 executing in one or more of the Virtual Machines 100 would themselves be used to provide storage resources to Virtual Environment 101.

Figure 3:
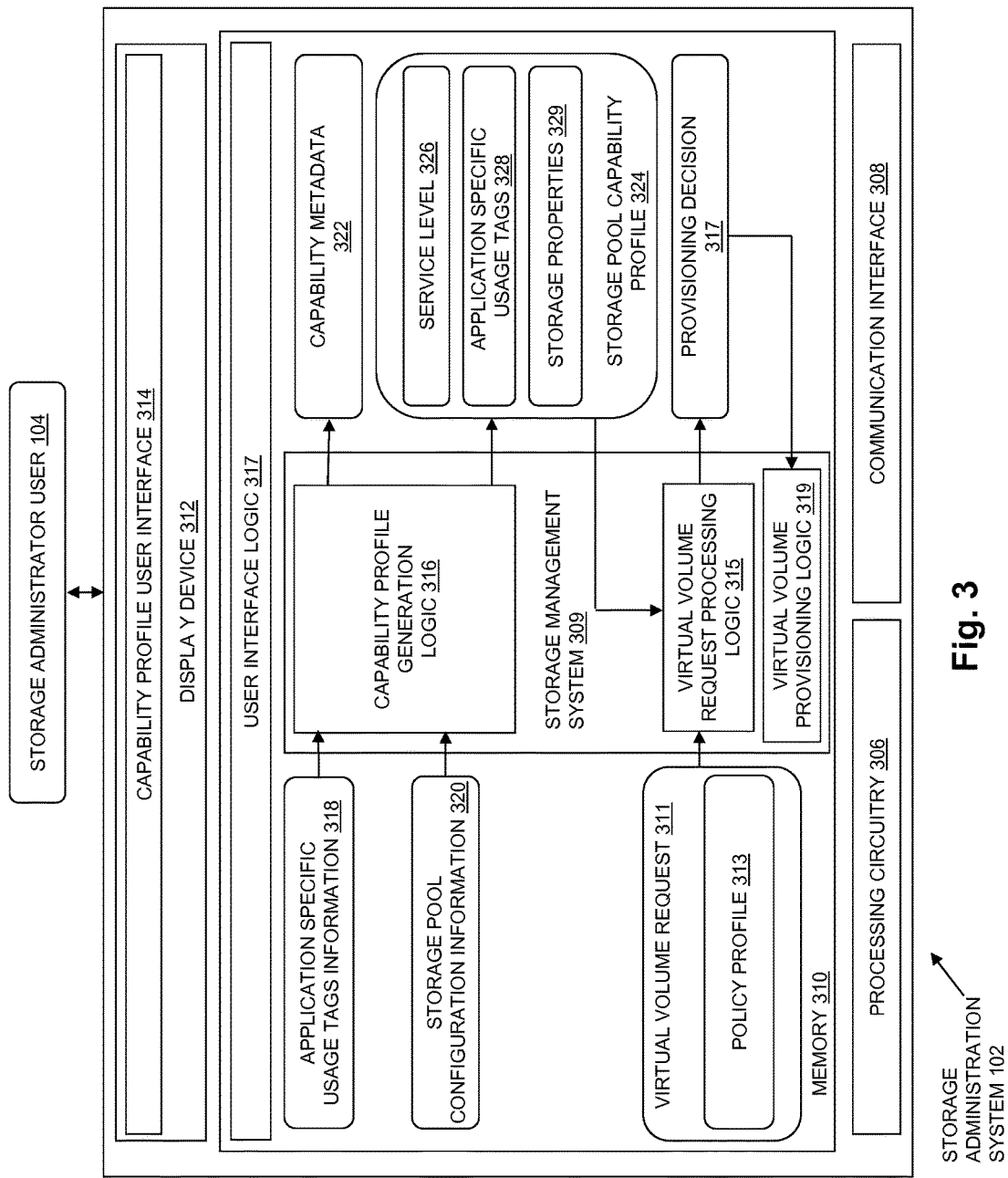
FIG. 3 is a block diagram showing an example of a storage administration system in an illustrative embodiment of the disclosed system.

FIG. 3 is a block diagram showing an example of a storage administration system in an illustrative embodiment of the disclosed system. As shown in FIG. 3, components in Storage Administration System 102 may include a Memory 310, Processing Circuitry 306 and a Communication Interface 308. Memory 310 may, for example, include or consist of any specific type of volatile or non-volatile semiconductor memory or the like that is operable to store programs (sequences of instructions) and/or data (e.g. program state information) for use in the Storage Administration System 102. Processing Circuitry 306 may, for example, include or consist of one or more microprocessors or the like. Communication Interface 308 may, for example, include or consist of one or more network interface cards (NICs) or the like. The Storage Administration System 102 is further shown including a Display Device 312.

In the illustrative embodiment of FIG. 3, Memory 310 stores program code for execution on the Processing Circuitry 306, including a Storage Management System 309, which may be used by a Storage Administrator User 104 to manage storage systems and associated storage devices (e.g. Storage Systems 120 and Storage Devices 130 in FIG. 1). The Storage Management System 309 may, for example, include Capability Profile Generation Logic 316, Virtual Volume Request Processing Logic 315, and Virtual Volume Provisioning Logic 319. The Memory 310 also stores data generated by and/or used during the execution of the Storage Management System 309, including Application Specific Usage Tag Information 318, Storage Pool Configuration Information 320, Capability Metadata 322, Storage Pool Capability Profile 324, Virtual Volume Request 311, and Provisioning Decision 317.

While in the embodiment of FIG. 3 the Capability Profile Generation Logic 316, Virtual Volume Request Processing Logic 315, and Virtual Volume Provisioning Logic 319 are located in the Storage Administration System 102, the disclosed system is not so limited. Alternatively, one or more of the Capability Profile Generation Logic 316, Virtual Volume Request Processing Logic 315, and/or Virtual Volume Provisioning Logic 319 may be located outside the Storage Administration System 102, such as, for example, within the Virtualization Environment Administration System 106, and/or within one or more of the Storage Systems 120.

During the process of provisioning storage resources to support a storage service provided by one of Storage Systems 120 to one of the Virtual Machines 100 shown in FIG. 1, the Capability Profile Generation Logic 316 generates a storage system capability profile (e.g. Storage Pool Capability Profile 324) describing the capabilities of a storage pool in a storage system (e.g. Storage Pool 216 in FIG. 2). The capability profile generated for a storage pool may also be considered to be the capability profile for the storage system that provides the storage pool. In order to generate Storage Pool Capability Profile 324, Capability Profile Generation Logic 316 processes information describing the specific configuration of the storage pool, shown in FIG. 3 as Storage Pool Configuration Information 320. Storage Pool Configuration Information 320 may, for example, include one or more data files or the like, and describe a variety of specific properties of the configuration of the storage pool, such as a platform type associated with the storage system that provides the storage pool, e.g. high-speed type of platform, low-speed type of platform, etc. Storage Pool Configuration Information 320 may further indicate the types of one or more drives from which the storage system allocates units of storage to the storage pool. Such drive type indications may, for example, include enterprise flash drive (EFD), serial attached SCSI (SAS), nearline SAS (NL-SAS), serial ATA (SATA) drive types, and/or any other specific type of disk drive. Storage Pool Configuration Information 320 may also indicate how different types of disk drives are organized into a multi-tiered arrangement to provide a multi-tiered storage pool, in which different sets of data are automatically assigned to different tiers of disk drives, the tiers having different performance characteristics, in order to improve performance. Storage Pool Configuration Information 320 may further indicate one or more types of RAID (Redundant Array of Independent Disks) architecture supported by the storage pool (e.g. RAID-1, RAID-2, RAID-3, RAID-4, RAID-5, RAID-6, RAID-10, etc.). And Storage Pool Configuration Information 320 may further indicate whether any types of performance optimization are provided for the storage pool, e.g. high speed caching of frequently used data to provide high speed access to such data. For example, the Storage Pool Configuration Information 320 may indicate whether a performance optimization such as FAST® (Fully Automatic Storage Tiering) Cache technology, provided by EMC Corporation, is provided for the storage pool.

The Capability Profile Generation Logic 316 generates a service level for the storage pool, shown in FIG. 3 as Service Level 326, based on Storage Pool Configuration Information 320. The Service Level 326 may, for example, include or consist of one of a fixed number of pre-defined service levels. Service Level 326 indicates an estimated overall level of performance available from the storage pool and/or storage system. For example, Service Level 326 may indicate an estimated average latency for input/output operations performed on the storage pool, based on the contents of the Storage Pool Configuration Information 320. In such an embodiment, in order to generate Service Level 326, Capability Profile Generation Logic 316 determines an estimated average latency for input/output operations performed on the storage pool, and then selects Service Level 326 from the fixed number of service levels based on that estimated average latency. In one embodiment, Service Level 326 indicates a service level objective (SLO) in terms of an estimated average latency for input/output operations performed on the storage pool.

In one embodiment, the fixed number of service levels from which Service Level 326 is selected by Capability Profile Generation Logic 316 may, for example, be made up of five service levels, i.e. Basic, Bronze, Silver, Gold, and Platinum service levels, each of which represents an amount of input/output operation latency. In such an embodiment, the Basic service level represents a highest amount or range of average input/output operation latency, Bronze represents the next highest amount or range of input/output operation latency, and so on, with Platinum representing the lowest amount or range of average input/output operation latency. Any other specific set of service levels may alternatively be used as the fixed number of service levels.

While the above includes a description of an embodiment in which the service level represents an overall level of performance available from the storage pool and/or storage system in terms of average input/output operation latency, the disclosed system is not so limited. Alternatively, the disclosed system may be embodied such that the service level represents an overall level of performance available from the storage pool and/or storage system in terms of some other performance metric(s), such as, for example, an estimated amount or average amount of input/output operations per second (IOPS) available from the storage pool and/or storage system.

The Capability Profile Generation Logic 316 stores Service Level 326 into Storage Pool Capability Profile 324. The Storage Pool Capability Profile 324 includes a number of capabilities, each of which has some number of constraints. Each capability in the Storage Pool Capability Profile 324 describes a parameter of the associated storage pool and/or storage system. For example, one or more lower level capabilities in the Storage Pool Capability Profile 324 (e.g. Storage Properties 329) may indicate a property of the specific configuration of the storage pool (e.g. Drive Type, RAID Types, FAST® Cache supported, etc.). In addition, one or more higher level capabilities in the Storage Pool Capability Profile 324 may indicate or provide a higher level representation of the pool's performance capabilities (e.g. Service Level 326, Application Specific Usage Tags 328). Each capability in the Storage Pool Capability Profile 324 has one or more associated constraints. The constraints for each capability in the Storage Pool Capability Profile 324 indicate the set of values, or range of values, that are supported for the capability by the storage pool. For example, Capability Profile Generation Logic 316 may store Service Level 326 into Storage Pool Capability Profile 324 as a constraint of a "Service Level" capability, indicating which one of the fixed number of pre-defined service levels describes the overall level of storage service performance that is supported by the storage pool.

Storage Administration System 102 may then transmit the Storage Pool Capability Profile 324 to Virtualization Environment Administration System 106, for use by Virtualization Environment Administrator User 108 in configuring one or more storage policy profiles representing the storage requirements of one or more virtual machines, for use in requesting the provisioning of storage resources for those virtual machines.

Storage Administration System 102 may subsequently receive, e.g. from the Virtualization Environment Administration System 106, a request to provision storage resources for use by one of Virtual Machines 100. For example, Virtual Volume Request 311 shown in FIG. 3 is a request to provision a virtual volume for use by one of the Virtual Machines 100. Virtual Volume Request 311 includes a Policy Profile 313 indicating the storage requirements of the virtual machine that will consume the storage provided from the provisioned virtual volume. Policy Profile 313 includes a number of capabilities with associated constraints that must all be contained in a capability profile of a storage pool in order for that storage pool to be used to provision the requested virtual volume. For example, Policy Profile 313 may include a "Service Level" capability with a constraint indicating one of the fixed number of pre-defined service levels. A constraint of the "Service Level" capability within the Policy Profile 313 must be matched by a constraint of a "Service Level" capability in a capability profile for a storage pool in order for the requested virtual volume to be provisioned from that storage pool. For example, if a "Service Level" capability in Policy Profile 313 has a constraint of "Gold", then only a storage pool having a capability profile with a "Service level" capability having a constraint of "Gold" may be used to provision the requested virtual volume for the virtual machine associated with the request.

Virtual Volume Request 311 is received by Virtual Volume Request Processing Logic 315, which compares Policy Profile 313 to one or more storage pool capability profiles, such as Storage Pool Capability Profile 324. If all capabilities listed in Policy Profile 313 have constraints that overlap constraints for the same capabilities in a single storage pool capability profile (e.g. Storage Pool Capability Profile 324), then Virtual Volume Request Processing Logic 315 generates a Provisioning Decision 317 indicating a match between the Policy Profile 313 and that storage pool capability profile. For example, if Service Level 326 is represented as a constraint of "Gold" for a service level capability in Storage Pool Capability Profile 324, and Policy Profile 313 also has a "Service Level" capability with a constraint of "Gold", then a constraint for the "Service Level" capability in Storage Pool Capability Profile 324 would overlap (i.e. match) the constraint for the "Service Level" capability indicated in the Policy Profile 313. If Policy Profile 313 included no other capabilities, or if all other constraints for capabilities in Policy Profile 313 overlapped constraints for capabilities in Storage Pool Capability Profile 324, then Storage Pool Capability Profile 324 would be determined to match Policy Profile 313, resulting in Provisioning Decision 317 indicating that the storage pool associated with Storage Pool Capability Profile 324 (e.g. Storage Pool 216 in FIG. 2) meets the storage performance requirements indicated by Policy Profile 313.

If Provisioning Decision 317 indicates a match between Policy Profile 313 and a storage pool capability profile (e.g. Storage Pool Capability Profile 324), it causes Virtual Volume Provisioning Logic 319 to provision a virtual volume from the storage pool associated with the storage pool capability profile, for use in providing a storage service or services to the virtual machine associated with Virtual Volume Request 311. In this way the disclosed system provisions storage resources having performance capabilities that match the level of storage performance requirements for that virtual machine.

In another aspect of the embodiment shown in FIG. 3, the Capability Profile Generation Logic 316 may generate one or more application specific usage tags for the Storage Pool 216, and store those application specific usage tags into Storage Capability Profile 324. For example, Capability Profile Generation Logic 316 may generate Application Specific Usage Tags 328 and store them into Storage Pool Capability Profile 324. The Application Specific Usage Tags 328 may each indicate a type of application that Storage Pool 216 is appropriate to support. For example, in the case where the configuration of Storage Pool 216 is appropriate for supporting applications that issue small, random input/output operations, Application Specific Usage Tags 328 may include an "OLTP" tag indicating that Storage Pool 216 is appropriate for supporting online transaction processing (OLTP) applications, which typically issue such small, random input/output operations.

In another example, Application Specific Usage Tags 328 may include a tag or tags indicating an application type or types that have what is referred to as an "application skew" corresponding to the configuration of different types of disk drives that provide Storage Pool 216 as a multi-tiered storage pool. During execution of certain types of applications, a relatively small percentage of overall storage capacity is responsible for a majority of input/output activity. For example, a type of application may have an input/output profile in which the great majority (e.g. 85 percent) of its input/output operations on a storage volume only involve a relatively small portion (e.g. 15 percent) of the volume's capacity. The relatively small portion of the volume receiving the great majority of the input/output operations may be referred to as the application type's "working set". The proportion of a volume's overall capacity that is used for an application type's working set may be referred to as the "application skew" for that application type. Application Specific Usage Tags 328 may include an indication of one or more application types that typically exhibit an amount of application skew that is well supported by the configuration of storage tiers underlying Storage Pool 216. Accordingly, Application Specific Usage Tags 328 may indicate one or more application types typically having a working set that can consistently be completely located on a storage tier or tiers having relatively higher performance disk drives within Storage Pool 216.

In another example, if the configuration of Storage Pool 216 is appropriate for supporting a database server application, Application Specific Usage Tags 328 may include a "DATABASE SERVER" tag. Other examples of tags representing types of applications that Storage Pool 216 may be appropriate to support include, "EMAILSERVER", "DATA ARCHIVE", "FILE STORAGE", and/or any other specific tags. In one embodiment, the Application Specific Usage Tags 328 may include any text string provided by Storage Administrator User 104 through a user interface of Storage Administration System 102.

In one embodiment, each of Application Specific Usage Tags 328 may, for example, be stored as constraints of a "Usage Tags" capability in Storage Pool Capability Profile 324.

Policy Profile 313 may also include one or more application specific usage tags, also as constraints of a "Usage Tags" capability. The application specific usage tags in Policy Profile 313 may, for example, indicate the type or types of one or more applications executing on the virtual machine for which storage resources are being requested to be provisioned, e.g. by Virtual Volume Request 311. Accordingly, Virtual Volume Request Processing Logic 315 may be embodied to compare the constraints in a "Usage Tags" capability in Policy Profile 313 to the constraints of "Usage Tags" capabilities in one or more storage pool capability profiles, such as Storage Pool Capability Profile 324. When comparing Policy Profile 313 to Storage Pool Capability Profile 324, the Virtual Volume Request Processing Logic 315 would consider the constraints in the "Usage Tags" capability in Policy Profile 313 to match the constraints of the "Usage Tags" capability in Storage Pool Capability Profile 324 if the constraints of the "Usage Tags" capability in Storage Pool Capability Profile 324 include the constraints of the "Usage Tags" capability in Policy Profile 313. Accordingly, the generation of a Provision Decision 317 indicating a match between Policy Profile 313 and Storage Pool Capability Profile 324, causing Virtual Volume Provisioning Logic 319 to provision a virtual volume for one of Virtual Machines 100 from Storage Pool 216, may further be based on the constraints of "Usage Tags" capabilities in Policy Profile 313 and Storage Pool Capability Profile 324.

In one embodiment, Capability Profile Generation Logic 316 generates Application Specific Usage Tags 328 based on Application Specific Usage Tags Information 318 received from Storage Administrator User 104 through Capability Profile User Interface 314. In such an embodiment, Capability Profile User Interface 314 is generated by User Interface Logic 317, and may include a graphical user interface, command line interface or RESTful API for programmatic access that enables Storage Administrator User 104 to create (e.g. type) one or more application specific usage tags for association with a storage pool. The application specific usage tags that are created by Storage Administrator User 104 are stored in Application Specific Tag Information 318, and then used by Capability Profile Generation Logic 316 to generate the Application Specific Usage Tags 328 stored in Storage Pool Capability Profile 324. For example, Capability Profile User Interface 314 may include one or more fields that enable Storage Administrator User 104 to type in one or more application type tags that are stored directly into Application Specific Usage Tags 328. In this way the disclosed system may be embodied to allow Storage Administrator User 104 to dynamically create one or more usage tags that indicate an application type or application types that are supported by a storage pool, e.g. Storage Pool 216.

The disclosed system may also be embodied such that Capability Profile Generation Logic 316 generates Capability Metadata 322. Capability Metadata 322 indicates the set of capabilities supported by a storage system (e.g. by Storage Pool 216), as well as the sets or ranges of constraints that the storage system supports for each capability. In such an embodiment, each time Storage Administrator User 104 creates a new application specific usage tag for association with a storage system (e.g. by typing the application specific usage tag into Capability Profile User Interface 314), that application specific usage tag becomes a new constraint supported by the storage system for the "Usage Tags" capability. As a result, in response to Storage Administrator User 104 creating a new application specific usage tag, Capability Profile Generation Logic 316 also updates or generates Capability Metadata 322, so that Capability Metadata 322 indicates that the "Usage Tags" capability for the storage system now has the new constraint, i.e. the newly created application specific usage tag. For example, if Storage Administrator User 104 types or otherwise enters a new application specific usage tag of "OLTP" into the Capability Profile User Interface 314, for association with Storage Pool 216, Capability Profile Generation Logic 316 both stores "OLTP" into Storage Pool Capability Profile 324 as part of Application Specific Usage Tags 328, and updates Capability Metadata 322 to indicate that "OLTP" is now a constraint that may be used with the "Usage Tags" capability in storage policy profiles used when requesting storage resource provisioning for virtual machines. Capability Profile Generation Logic 316 then sends a metadata update message to Virtualization Environment Administration System 106, including the updated Capability Metadata 322. Upon receipt of the metadata update message including the updated version of Capability Metadata 322, Virtualization Environment Administrator User 108 may include the new "OLTP" constraint with the "Usage Tags" capability in storage policy profiles (e.g. Policy Profile 313), e.g. as part of a storage resource provisioning requests (e.g. Virtual Volume Request 311) that request provisioning storage resources for virtual machines. Accordingly, in the case where a storage resource provisioning request is subsequently issued on behalf of one of Virtual Machines 100 that executes an OLTP application program, the storage policy profile within that provisioning request may include a "Usage Tags" capability with an "OLTP" constraint.

Capability Profile Generation Logic 316 may further include some amount of the information from Storage Pool Configuration Information 320 as constraints in a number of lower level storage property capabilities contained in the Storage Pool Capability Profile 324, shown in FIG. 3 as Storage Properties 329. Such lower level storage capabilities may have constraints describing specific aspects of the configuration of the storage pool, such as, for example, the type of the storage platform (e.g. high-speed type of platform, low-speed type of platform, etc.), the types of one or more drives from which the storage system allocates units of storage to the storage pool (e.g. EFD, SAS, NL-SAS, SATA, etc.), how different types of disk drives are organized into a multi-tiered arrangement to provide a multi-tiered storage pool, the types of RAID architecture supported by the storage pool (e.g. RAID-1, RAID-2, RAID-3, RAID-4, RAID-5, RAID-6, RAID-10, etc.), and/or the types of performance optimization that are provided for the storage pool (e.g. FAST® Cache).

Figure 4:
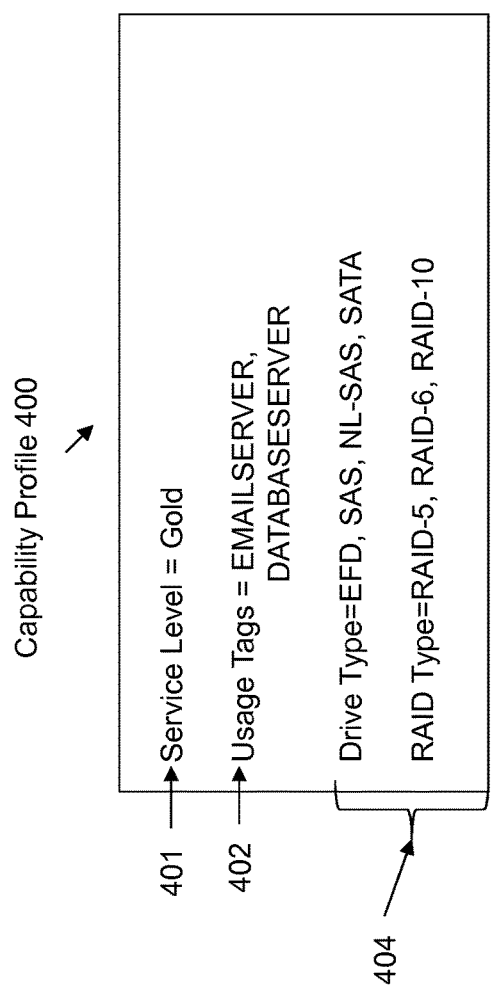
FIG. 4 shows an example of a storage system capability profile in an illustrative embodiment of the disclosed system.

FIG. 4 shows an example of a storage system capability profile, i.e. Capability Profile 400. The Capability Profile 400 of FIG. 4 includes a Service Level Capability 401, a Usage Tags Capability 402, and a number of Lower Level Storage Properties Capabilities 404.

The Service Level Capability 401 has a "Gold" constraint, indicating that the overall level of performance (e.g. in terms of average input/output operation latency, IOPS, etc.) supported by the storage pool and/or storage system associated with Capability Profile 400 is equal to a performance level associated with the "Gold" service level constraint. The Usage Tags capability 402 has "EMAILSERVER" and "DATABASESERVER" constraints, indicating that the storage pool and/or storage system associated with Capability Profile 400 is appropriate for providing storage (e.g. a virtual volume) to a virtual machine that runs email server or database server applications.

Lower Level Storage Properties Capabilities 404 include a Drive Type capability having EFD, SAS, NL-SAS and SATA constraints, indicating that the drive types providing physical storage for the storage pool and/or storage system associated with Capability Profile 400 include EFD, SAS, NL-SAS and SATA drives. Lower Level Storage Properties Capabilities 404 further include a RAID Type capability having RAID-5, RAID-6 and RAID-10 constraints, indicating that the RAID types supported by the storage pool and/or storage system associated with Capability Profile 400 include RAID-5, RAID-6 and RAID-10.

Figure 5:
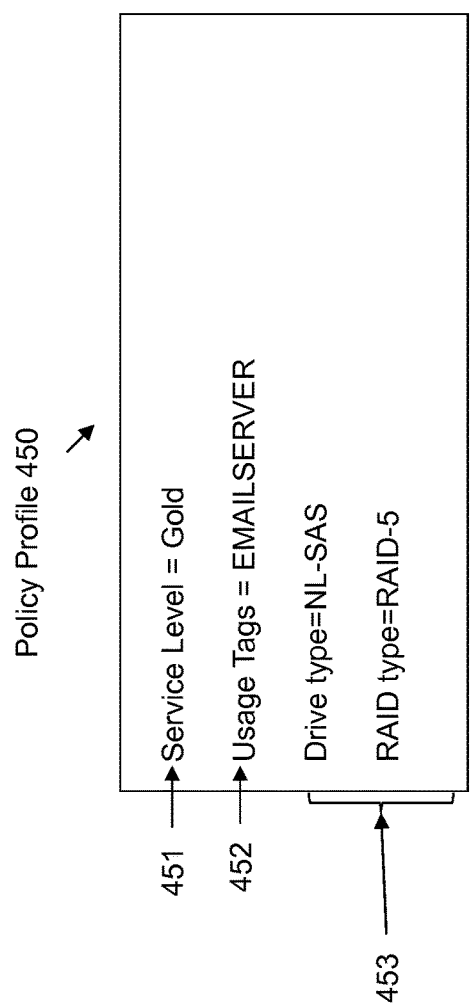
FIG. 5 shows an example of a storage policy profile in an illustrative embodiment of the disclosed system.

FIG. 5 shows an example of a policy profile, i.e. Policy Profile 450. Policy Profile 450 includes a Service Level capability 451, a Usage Tags capability 452, and a number of Lower Level Storage Properties Capabilities 453. The Service Level capability 451 has a constraint of "Gold", indicating that the virtual machine associated with a request for storage resource provisioning including the Policy Profile 450 requires storage resources having an overall level of available performance equal to the performance level associated with the "Gold" service level constraint (e.g. in terms of average input/output operation latency, IOPS, etc.). The Usage Tags capability 452 has an EMAILSERVER constraint, indicating that the virtual machine associated with the request for storage resource provisioning including Policy Profile 450 is executing an email server program. In Lower Level Storage Properties Capabilities 453, the Drive type capability has an NL-SAS constraint indicating that a storage pool must include NL-SAS drives in order to be used to provision storage resources for the virtual machine associated with the request for storage resource provisioning that includes Policy Profile 450. The RAID type capability has a RAID-5 constraint, indicating that a storage pool must have RAID-5 capability in order to be used to provision storage resources for the virtual machine associated with the request for storage resource provisioning including Policy Profile 450.

In the case where Policy Profile 450 is included in a storage resource provisioning request, and compared with Capability Profile 400, Capability Profile 400 would be determined to match Policy Profile 450, because each constraint in a capability in Policy Profile 450 matches a constraint within the same capability within Capability Profile 400.

While the Capability Profile 400 and Policy Profile 450 in FIGS. 4 and 5 include both service level and usage tags capabilities, as well as lower level storage property capabilities, the disclosed system is not limited to capability profiles or policy profiles that include that specific set of capabilities. Alternatively, embodiments of the disclosed system may use capability profiles and/or policy profiles that include any specific combination of one or more of the capabilities described herein.

Figure 6:
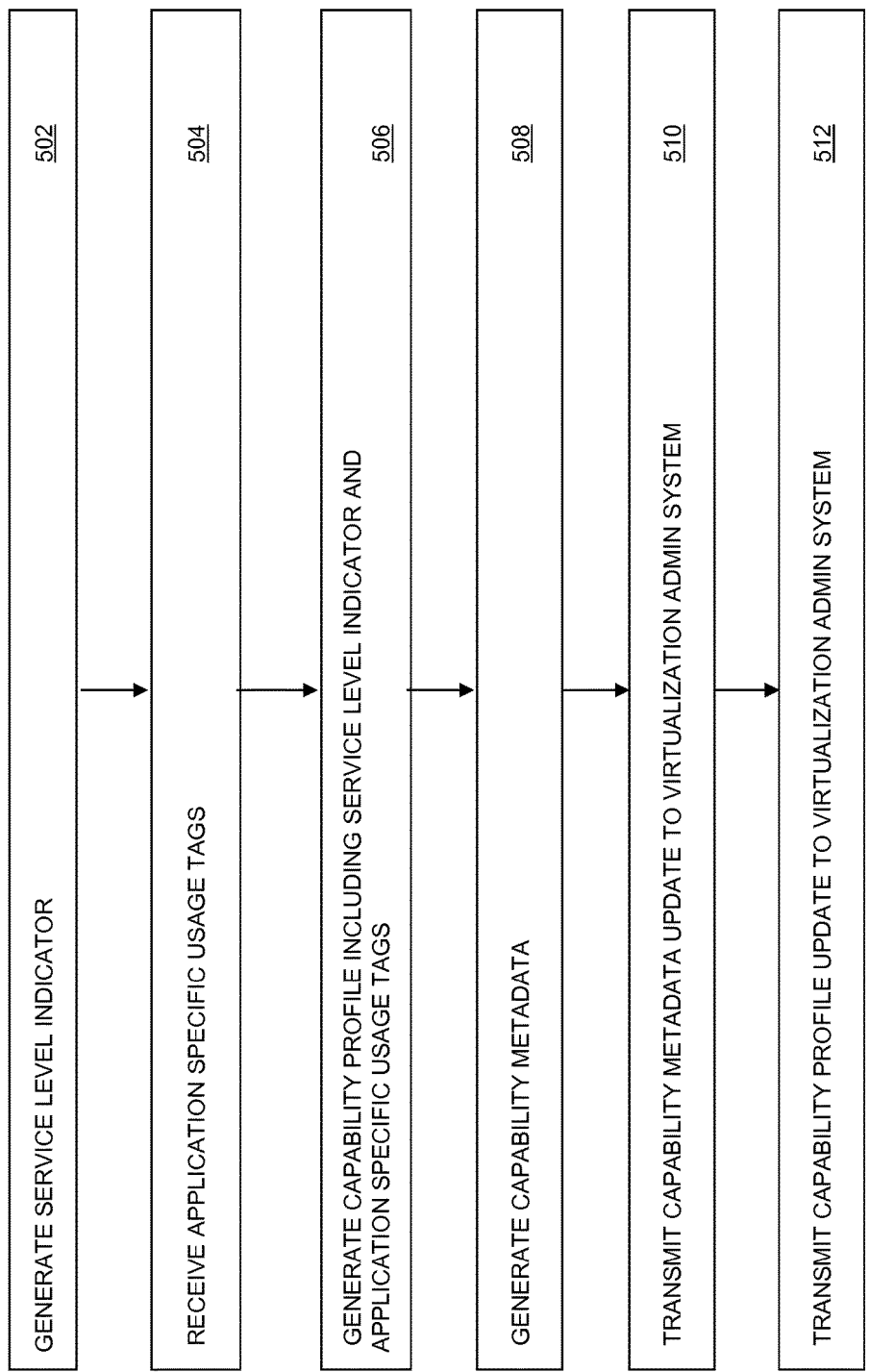
FIG. 6 is a flow chart showing an example of steps performed in an illustrative embodiment of the disclosed system to generate a capability profile.

FIG. 6 is a flow chart showing an example of steps performed in an illustrative embodiment of the disclosed system to generate a capability profile. In one embodiment, the steps of FIG. 6 may be performed by the Storage Administration System 102 shown in FIG. 1. Based on the storage pool configuration information (e.g. Storage Pool Configuration Information 320 in FIG. 3), at step 502 the Storage Administration System 102 generates a service level indicator (e.g. Service Level 326 in FIG. 3) that is one of a fixed number of service levels. For example, at step 502 the Storage Administration System 102 may generate one of the fixed number of service levels Basic, Bronze, Silver, Gold or Platinum, indicating an estimated overall level of performance for the storage pool.

At step 504, the Storage Administration System 102 receives application specific usage tag information, such as one or more tags dynamically created (e.g. typed) by a storage administrator user (e.g. Storage Administrator User 104 in FIG. 1) that each indicate a type of application for which the storage pool is well suited to provide storage resources. At step 506 the Storage Administration System 102 generates a capability profile that includes the service level indicator generated in step 502 and the application specific usage tags created at step 504.

At step 508 the Storage Administration System 102 generates capability metadata describing the application specific usage tags created at step 504, and indicating that the application specific usage tags created at step 504 may be included as constraints in policy profiles indicating storage service requirements of storage resource provisioning requests. At step 510 Storage Administration System 102 transmits a capability update message including the capability metadata generated to at step 508 to a virtualization environment administration system (e.g. Virtualization Environment Administration System 106 in FIG. 1), so that a virtualization environment administrator user (e.g. Virtualization Environment Administrator User 108) can use the application specific usage tags created at step 504 as constraints in one or more policy profiles. At step 512 the Storage Administration System 102 transmits a capability profile update message to the virtualization environment administration system including the capability profile generated at step 506.

Figure 7:
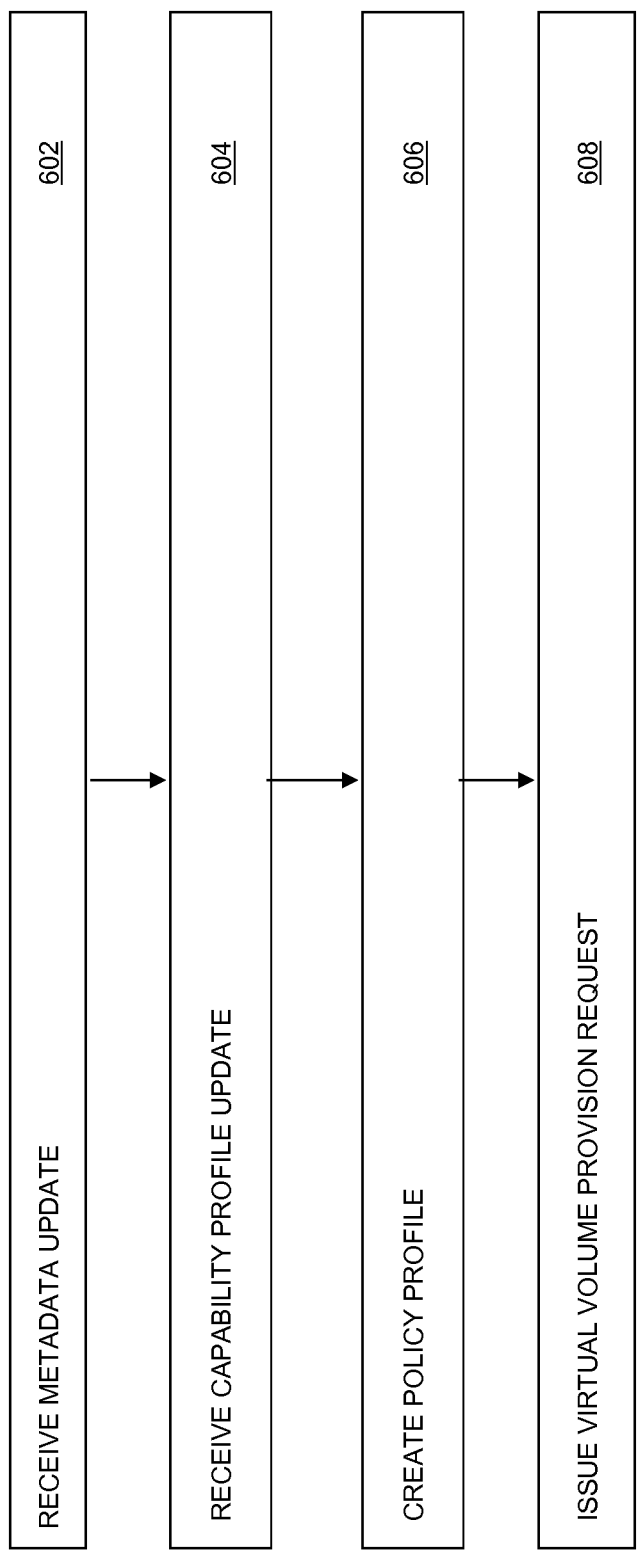
FIG. 7 is a flow chart showing an example of steps performed to generate a policy profile.

FIG. 7 is a flow chart showing an example of steps performed to generate a policy profile. In one embodiment, the steps of FIG. 7 are performed by a virtualization environment administration system, e.g. Virtualization Environment Administration System 106 in FIG. 1. At step 602 Virtualization Environment Administration System 106 receives the metadata update message from the Storage Administration System 102, and at step 604 Virtualization Environment Administration System 106 receives the capability profile update message from the Storage Administration System 102. At step 606 Virtualization Environment Administration System 106 creates a policy profile describing the required service level, application specific usage tags, and/or lower level storage property capabilities for a storage pool in order for that storage pool to be used to provision storage resources for a virtual machine (e.g. one of Virtual Machines 100 in FIG. 1). At step 608 the Virtualization Environment Administration System 106 issues (e.g. transmits) a storage provisioning request (e.g. Virtual Volume Request 311 in FIG. 1) to Storage Administration System 102 to request provisioning of storage resources (e.g. a virtual volume) for use by the virtual machine.

FIG. 8 is a flow chart showing an example of steps performed in an illustrative embodiment of the disclosed system to determine whether a request for provisioning of storage resources will be granted. In one embodiment, the steps of FIG. 8 are performed by the Storage Administration System 106 shown in FIG. 1. At step 700, the Storage Administration System 106 receives a request to provision storage resources to be used by a virtual machine, e.g. Virtual Volume Request 311 shown in FIG. 1. At step 702, the Storage Administration System 106 compares the storage policy profile contained in the provisioning request to one or more capability profiles. For example, at step 702, the Storage Administration System 106 may compare the policy profile contained in the request to capability profiles associated with one or more of the Storage Systems 120 shown in FIG. 1. If one of the capability profiles for one of the storage systems 120 shown in FIG. 1 matches the policy profile in the request to provision storage resources, the Storage Administration System 106 causes a virtual volume to be provisioned from the storage pool of the storage system associated with the matching capability profile. The provisioned virtual volume may then be used to provide storage for the virtual machine associated with the request to provision storage resources.

Those skilled in the art will recognize that the disclosed system is significantly more than merely the abstract idea of generating a service level. Instead, the disclosed system addresses various specific shortcomings arising in previous technical solutions, including shortcomings arising from the limited type of information provided by previous systems during the storage resource provisioning process. For example, the static service levels that may be generated for and included in the storage system capability profiles advantageously enable the use of corresponding service levels in the policy profiles for specific virtual machines, thus providing virtualization administration systems and their users with a more convenient and powerful mechanism for specifying the needs of individual virtual machines during the storage provisioning process. In addition, the application specific usage tags may further allow storage system management systems and administrators to expose the capabilities of storage systems in a succinct and meaningful way that further allows virtualization administration systems and administrators to request storage resource provisioning based on the applications running on the virtual machines in the virtualization environment. The advantages of embodiments of the disclosed system over previous systems may accordingly include improved provisioning of storage resources for virtual machines, which in turn may result in higher levels of overall system performance. The advantages of embodiments of the disclosed system over previous systems may further include improved usability for systems supporting the storage provisioning process.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of provisioning storage for a virtual machine executing in a virtualization environment, comprising executing, on at least one processor, the steps of:

generating, in response to performance characteristics of a storage system, a service level for the storage system, wherein the service level for the storage system is one of a fixed number of service levels, and wherein the service level for the storage system indicates a level of performance available from the storage system;

storing the service level for the storage system into a capability profile for the storage system;

receiving a request to provision storage resources for the virtual machine executing in the virtualization environment, wherein the request to provision storage resources includes a policy profile including a requested service level, wherein the requested service level indicates a level of storage performance requested for the virtual machine;

comparing the policy profile in the request to provision storage resources for the virtual machine to the capability profile for the storage system, wherein the comparing includes comparing the requested service level to the service level for the storage system;

provisioning storage resources from the storage system for use by the virtual machine in response to the requested service level matching the service level for the storage system;

generating at least one application specific usage tag for the storage system, wherein the application specific usage tag for the storage system indicates a type of application that a configuration of storage tiers underlying a storage pool in the storage system is appropriate to support, and wherein generating the application specific usage tag for the storage system includes, in response to a determination that the configuration of storage tiers underlying the storage pool in the storage system is appropriate for supporting applications that issue small, random input/output operations, generating an application specific usage tag for the storage system that indicates that the storage pool is appropriate for supporting online transaction processing (OLTP) applications;

storing the application specific usage tag for the storage system into the capability profile for the storage system;

wherein the policy profile in the request to provision storage resources for the virtual machine further includes at least one application specific usage tag, wherein the application specific usage tag in the policy profile indicates a type of application that executes on the virtual machine;

wherein comparing the policy profile in the request to provision storage resources for the virtual machine to the capability profile for the storage system further includes comparing the application specific usage tag in the policy profile to the application specific usage tag in the capability profile; and wherein provisioning storage resources from the storage system for use by the virtual machine is further in response to the application specific usage tag in the policy profile matching the application specific usage tag in the capability profile.

2. The method of claim 1, further comprising:
determining, in response to the application specific usage tag for the storage system, a set of metadata for the application specific usage tag for the storage system; and
transmitting the metadata for the application specific usage tag for the storage system to a virtualization administrator system associated with the virtualization environment for use in generating the policy profile.

3. The method of claim 1, wherein generating the application specific usage tag for the storage system further includes:
generating an application specific tag user interface on a storage administrator system, wherein the application specific tag user interface enables a user of the storage administrator system to indicate at least one application specific tag; and receiving the application specific usage tag for the storage system through the application specific tag user interface on the storage administrator system.

4. The method of claim 1, further comprising:
wherein the performance characteristics of the storage system include an indication of a type of disk drive used by the storage system; and
wherein generating the service level for the storage system is responsive to the indication of the type of disk drive used by the storage system.

5. The method of claim 1, further comprising:
wherein the performance characteristics of the storage system include an indication of a redundant array of independent disks (RAID) architecture used by the storage system; and
wherein generating the service level for the storage system is responsive to the indication of the of the RAID architecture used by the storage system.

6. The method of claim 1, further comprising:
wherein the performance characteristics of the storage system include an indication of whether the storage system supports high speed caching of data; and
wherein generating the service level for the storage system is responsive to the indication of whether the storage system supports high speed caching.

7. The method of claim 1, wherein each of the fixed number of service levels indicates a different estimated average latency for input/output operations, and wherein generating the service level for the storage system further comprises:
determining an estimated average latency for input/output operations issued to the storage system; and
wherein the service level generated for the storage system indicates an average latency for input/output operations corresponding to the estimated average latency for input output operations determined for the storage system.

8. The method of claim 1, further comprising:
wherein generating the service level for the storage system is performed automatically by a storage administrator system;
wherein the fixed number of service levels comprises a predefined set of service levels; and
wherein the requested service level included in the request to provision storage resources for the virtual machine is one of the fixed number of service levels.

9. The method of claim 8, further comprising:
wherein a set of physical storage devices are attached to the storage system;
wherein the storage system includes a storage pool that organizes units of storage space allocated from the physical storage devices that are attached to the storage system to form one or more virtual volumes;
wherein the virtual volumes formed from the storage pool of the storage system are exposed for access through one or more protocol endpoints contained within the storage system;
wherein the service level for the storage system describes the overall level of storage service performance supported by the storage pool in the storage system;
wherein the application specific usage tag for the storage system indicates a type of application that the storage pool in the storage system is appropriate to support; and
wherein the request to provision storage resources for the virtual machine comprises a request to provision a virtual volume from the storage pool in the storage system.

10. The method of claim 9, wherein the storage system is one of a plurality of storage systems that are managed by a storage administrator user using the storage administrator system;

wherein the virtual machine is one of a plurality of virtual machines that are managed by a virtualization environment administrator user using a virtualization environment administration system;

wherein the application specific usage tag for the storage system indicates at least one application type that typically has a working set that can be located on at least one high performance disk drive that is located within the set of physical storage devices that are attached to the storage system;

wherein generating the application specific usage tag for the storage system includes i) generating an application specific tag user interface on the storage administrator system, wherein the application specific tag user interface enables a user of the storage administrator system to indicate at least one application specific tag, and ii) receiving the application specific usage tag for the storage system through the application specific tag user interface on the storage administrator system; and the method further comprising:

in response to receiving the application specific usage tag for the storage system through the application specific tag user interface, i) automatically determining, by the storage administrator system, a set of metadata for the application specific usage tag for the storage system, and ii) automatically transmitting the metadata for the application specific usage tag for the storage system from the storage administrator system to the virtualization administrator system, wherein the metadata for the application specific usage tag indicates to the virtualization administrator system that the application specific usage tag may be included as a usage tag constraint in a policy profile in a request to provision storage resources for one of the plurality of virtual machines.

11. A computerized system for provisioning storage for a virtual machine executing in a virtualization environment, comprising:

at least one hardware processor;

a memory having program code stored thereon, wherein the program code, when executed by the processor, causes the processor to generate, in response to performance characteristics of a storage system, a service level for the storage system, wherein the service level for the storage system is one of a fixed number of service levels, and wherein the service level for the storage system indicates a level of performance available from the storage system;

store the service level for the storage system into a capability profile for the storage system;

receive a request to provision storage resources for the virtual machine executing in the virtualization environment, wherein the request to provision storage resources includes a policy profile including a requested service level, wherein the requested service level indicates a level of storage performance requested for the virtual machine;

compare the policy profile in the request to provision storage resources for the virtual machine to the capability profile for the storage system, wherein the comparing includes comparing the requested service level to the service level for the storage system;

provision storage resources from the storage system for use by the virtual machine in response to the requested service level matching the service level for the storage system; and generate at least one application specific usage tag for the storage system, wherein the application specific usage tag for the storage system indicates a type of application that a configuration of storage tiers underlying a storage pool in the storage system is appropriate to support, and store the application specific usage tag for the storage system into the capability profile for the storage system, and wherein the generating the application specific usage tag for the storage system is generated at least in part by, in response to a determination that the configuration of storage tiers underlying the storage pool in the storage system is appropriate for supporting applications that issue small, random input/output operations, causing the processor to generate an application specific usage tag for the storage system that indicates that the storage pool is appropriate for supporting online transaction processing (OLTP) applications;

wherein the policy profile in the request to provision storage resources for the virtual machine further includes at least one application specific usage tag, wherein the application specific usage tag in the policy profile indicates a type of application that executes on the virtual machine;

wherein comparing the policy profile in the request to provision storage resources for the virtual machine to the capability profile for the storage system further includes comparing the application specific usage tag in the policy profile to the application specific usage tag in the capability profile; and wherein provisioning storage resources from the storage system for use by the virtual machine is further in response to the application specific usage tag in the policy profile matching the application specific usage tag in the capability profile.

12. The system of claim 11, wherein the program code, when executed on the processor, further causes the processor to:

determine, in response to the application specific usage tag for the storage system, a set of metadata for the application specific usage tag for the storage system; and transmit the metadata for the application specific usage tag for the storage system to a virtualization administrator system associated with the virtualization environment for use in generating the policy profile.

13. The system of claim 11, wherein the program code, when executed on the processor, further causes the processor to:

generate the application specific usage tag for the storage system by generating an application specific tag user interface on a storage administrator system, wherein the application specific tag user interface enables a user of the storage administrator system to indicate at least one application specific tag, and receiving the application specific usage tag for the storage system through the application specific tag user interface on the storage administrator system.

14. The system of claim 11, further comprising:

wherein the performance characteristics of the storage system include an indication of a type of disk drive used by the storage system; and wherein the service level for the storage system is generated responsive to the indication of the type of disk drive used by the storage system.

15. The system of claim 11, further comprising:
wherein the performance characteristics of the storage system include an indication of a redundant array of independent disks (RAID) architecture used by the storage system; and
wherein the service level for the storage system is generated responsive to the indication of the of the RAID architecture used by the storage system.

16. The system of claim 11, further comprising:
wherein the performance characteristics of the storage system include an indication of whether the storage system supports high speed caching of data; and
wherein the service level for the storage system is generated responsive to the indication of whether the storage system supports high speed caching.

17. The system of claim 11, further comprising:
wherein each of the fixed number of service levels indicates a different estimated average latency for input/output operations;
wherein the program code, when executed on the processor, further causes the processor to generate the service level for the storage system by determining an estimated average latency for input/output operations issued to the storage system; and
wherein the service level generated for the storage system indicates an average latency for input/output operations corresponding to the estimated average latency for input output operations determined for the storage system.

18. A non-transitory computer readable medium for provisioning storage for a virtual machine executing in a virtualization environment, the non-transitory medium having instructions stored thereon, that when executed on a processor of a computer, perform the steps of:
generating, in response to performance characteristics of a storage system, a service level for the storage system, wherein the service level for the storage system is one of a fixed number of service levels, and wherein the service level for the storage system indicates a level of performance available from the storage system;
storing the service level for the storage system into a capability profile for the storage system;
receiving a request to provision storage resources for the virtual machine executing in the virtualization environment, wherein the request to provision storage resources includes a policy profile including a requested service level, wherein the requested service level indicates a level of storage performance requested for the virtual machine;
comparing the policy profile in the request to provision storage resources for the virtual machine to the capability profile for the storage system, wherein the comparing includes comparing the requested service level to the service level for the storage system;
provisioning storage resources from the storage system for use by the virtual machine in response to the requested service level matching the service level for the storage system;
generating at least one application specific usage tag for the storage system, wherein the application specific usage tag for the storage system indicates a type of application that a configuration of storage tiers underlying a storage pool in the storage system is appropriate to support, and wherein generating the application specific usage tag tag for the storage system includes, in response to a determination that the configuration of storage tiers underlying the storage pool in the storage system is appropriate for supporting applications that issue small, random input/output operations, generating an application specific usage tag for the storage system that indicates that the storage pool is appropriate for supporting online transaction processing (OLTP) applications;
storing the application specific usage tag for the storage system into the capability profile for the storage system;
wherein the policy profile in the request to provision storage resources for the virtual machine further includes at least one application specific usage tag, wherein the application specific usage tag in the policy profile indicates a type of application that executes on the virtual machine;
wherein comparing the policy profile in the request to provision storage resources for the virtual machine to the capability profile for the storage system further includes comparing the application specific usage tag in the policy profile to the application specific usage tag in the capability profile; and
wherein provisioning storage resources from the storage system for use by the virtual machine is further in response to the application specific usage tag in the policy profile matching the application specific usage tag in the capability profile.

19. A computer-implemented method of provisioning storage for a virtual machine executing in a virtualization environment, comprising executing, on at least one processor, the steps of:
generating, in response to performance characteristics of a storage system, a service level for the storage system, wherein the service level for the storage system is one of a fixed number of service levels, and wherein the service level for the storage system indicates a level of performance available from the storage system;
storing the service level for the storage system into a capability profile for the storage system;
receiving a request to provision storage resources for the virtual machine executing in the virtualization environment, wherein the request to provision storage resources includes a policy profile including a requested service level, wherein the requested service level indicates a level of storage performance requested for the virtual machine;
comparing the policy profile in the request to provision storage resources for the virtual machine to the capability profile for the storage system, wherein the comparing includes comparing the requested service level to the service level for the storage system;
provisioning storage resources from the storage system for use by the virtual machine in response to the requested service level matching the service level for the storage system;
generating at least one application specific usage tag for the storage system, wherein the application specific usage tag for the storage system indicates a type of application that a configuration of storage tiers underlying a storage pool in the storage system is appropriate to support, and wherein generating the application specific user tag for the storage system includes, in response to a determination that the configuration of storage tiers underlying the storage pool in the storage system is appropriate for supporting applications that issue small, random input/output operations, generating an application specific usage tad for the storage system that indicates that the storage pool is appropriate for supporting online transaction processing (OLTP) applications storing the application specific usage tag for the storage system into the capability profile for the storage system;

wherein the policy profile in the request to provision storage resources for the virtual machine further includes at least one application specific usage tag, wherein the application specific usage tag in the policy profile indicates a type of application that executes on the virtual machine;

wherein comparing the policy profile in the request to provision storage resources for the virtual machine to the capability profile for the storage system further includes comparing the application specific usage tag in the policy profile to the application specific usage tag in the capability profile; and wherein provisioning storage resources from the storage system for use by the virtual machine is further in response to the application specific usage tag in the policy profile matching the application specific usage tag in the capability profile.

* * * * *